(No Model.) 2 Sheets—Sheet 1.
E. E. KELLER.
ELECTRICALLY PROPELLED PERAMBULATOR.

No. 523,354. Patented July 24, 1894.

WITNESSES INVENTOR
Emil E. Keller
BY Francis W. Parker,
ATTORNEY (No Model.) 2 Sheets—Sheet 2.

E. E. KELLER.
ELECTRICALLY PROPELLED PERAMBULATOR.

No. 523,354. Patented July 24, 1894.

WITNESSES
M E Moore
Walter J. Gunthorp

INVENTOR
Emil E. Keller
BY
Francis W. Parker,
ATTORNEY

UNITED STATES PATENT OFFICE.

EMIL E. KELLER, OF CHICAGO, ILLINOIS.

ELECTRICALLY-PROPELLED PERAMBULATOR.

SPECIFICATION forming part of Letters Patent No. 523,354, dated July 24, 1894.

Application filed April 20, 1892. Serial No. 429,895. (No model.)

*To all whom it may concern:*

Be it known that I, EMIL E. KELLER, a citizen of the United States, residing at Chicago, county of Cook, and State of Illinois, have invented a new and useful Perambulator, of which the following is a specification.

My invention relates to electric perambulators, and has for its object to provide convenient means whereby electricity as a motive power may be applied to perambulators such as are useful for moving persons about through a building, exposition, or the like, as well as on the street. The improvements here shown are capable of much wider application, though I have especially designed them for the purpose suggested.

My invention is illustrated in the accompanying drawings, wherein—

Figure 1:
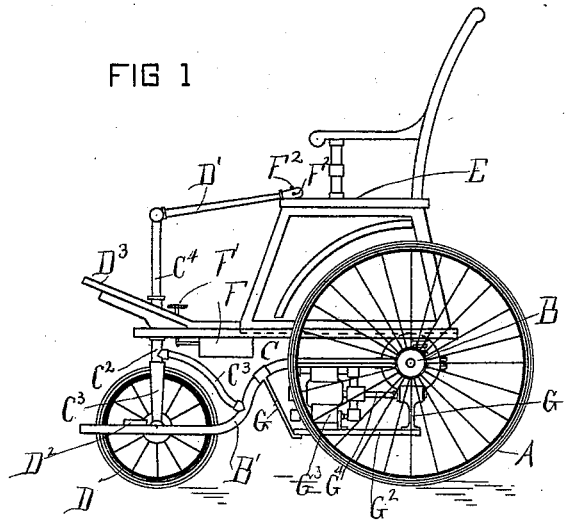
Figure 2:
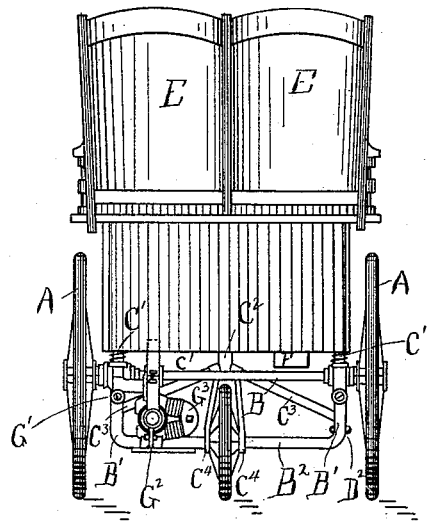
Figure 3:
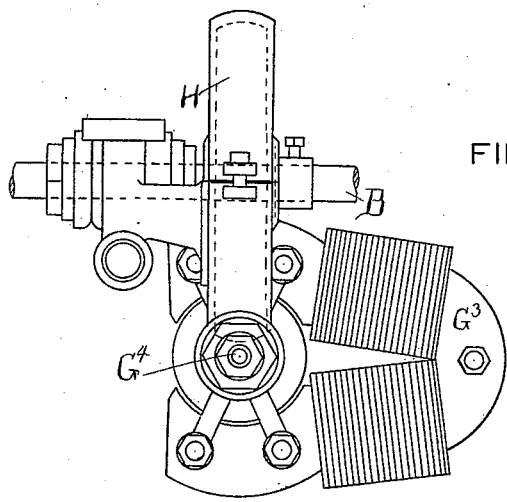
Figure 4:
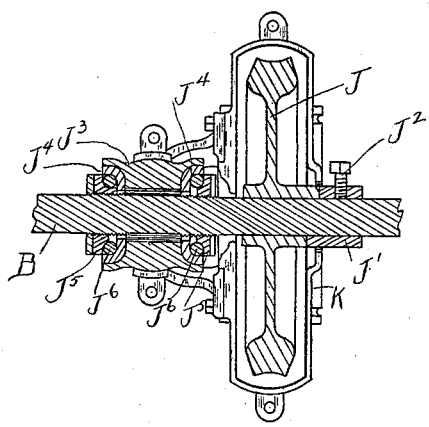
Figure 5:
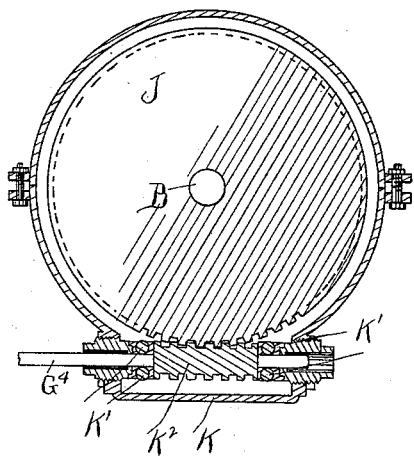

Figure 1 is a side view of the perambulator. Fig. 2 is a rear view of the perambulator. Fig. 3 is a detail rear view of the motor, axle and connecting parts. Fig. 4 is a horizontal longitudinal section through the axle and worm gear. Fig. 5 is a vertical cross section through the axle, worm gear and driving screw.

Like parts are indicated by the same letters in all the figures.

A, A, are the rear driving wheels on the axle B. From this axle, forwardly projecting are the side bars B', B', of the frame, which are connected in front by the cross bar B².

C is the floor of the perambulator, which is suitably supported on the springs C', C', at the rear, and carries a pendent collar C², in front, which is supported by the braces C³ C³ connected to the said bars. Between the lower ends C⁴, C⁴, of the bifurcated rod C⁴, is journaled the forward wheel D. The rod C⁴ projects upwardly through the floor and platform D³ and is supported by the pendent collar C² and braces C³ C³ and has a handle D', whereby the wheel D may be moved to direct the perambulator in a manner similar to bicycles and other such machines. On the frame is the step D², and on the floor is the platform D³ for the feet. Rising above the floor are the seats E, E, of any convenient size and shape. Secured beneath the floor is the switch box F, with the controlling foot piece F' associated therewith. F², F², are buttons in the handle D', adapted to close electric circuits, energizing separate electro-magnets and this to assist in operating the reversing mechanisms of the electric switch in the box F.

Downwardly depending from the frame and axle are the bars G, whereby the plate G² is supported, and on this latter the driving motor G³ is carried. The armature shaft G⁴, of this motor is journaled in suitable bearings supported by the plate G². On the axle B, is a two part case H, within which the worm gear J is placed. This worm gear is loose upon the axle B, but is adapted to engage a lock collar J'. By means of teeth on the face of the hub of said worm gear and said collar said collar may be secured to the axle by the set screw J². The case is suitably supported upon the frame and to the collar J³, which is provided with a large aperture through which the axle passes. At the ends of this collar are secured the hard disk shaped pieces J⁴, J⁴, which are loose on the axle and to which are opposed the hard metal pieces J⁵, J⁵, screw threaded on the axle, and between these two disk shaped pieces are disposed the the anti-friction rollers J⁶. The collar J³, does not rotate with the shaft on account of the pieces attached to the case H, which said collar helps to support. Toward the lower part of the case is a horizontal portion K, into which passes the extended end of the armature shaft G⁴, which is supported on the anti-friction rollers K', K', and carries the screw K², which meshes with the worm gear J. Thus the rotation of the armature shaft transmits its motion to the screw, this to the worm wheel, this in turn to the axle and driving wheels, when the worm gear is locked to the axle by its engagement with the lock collar J'.

The use and operation of my invention is as follows: The perambulator, constructed substantially as shown, is under perfect and convenient control of the rider. I have not shown in detail all of the obviously necessary features of construction, such, for example, as the circuit connections with the buttons F², F², and other features which will be intelligible to any and all persons familiar with the art. A person desiring to use the perambulator which is normally out of circuit, will step upon the step D², and thence mount the vehicle, where he will be seated within convenient reach of the controlling handle D', and foot lever F'. Swinging the handle to the right or to the left, he can determine the direction of the perambulator or turn it around. To start the perambulator, the operator pushes on one of the buttons $F^2$, $F^2$, which by means of a local circuit closes the switch in box F and sends a current through the armature in one direction, proper resistances being interposed, causing it to rotate. This motion will be conveyed to the worm $K^2$, thence to the worm gear J, thence to driving axle B, and thence to the driving wheels A, A, and set the machine in motion.

To stop the machine, the operator presses with his foot upon the lever F', which operates the switch in box F, so as to break the circuit.

To reverse the machine, he pushes upon the other button $F^2$, which operates the switch so as to cause the current to pass through the armature in the opposite direction to that described above, causing said armature to rotate in an opposite direction, and hence reversing the motion of the car.

My device as originally presented in this application has been by requirement of office, divided, and a portion of it put into a divisional application filed July 12, 1893, Serial No. 480,226. In this application I show only the perambulator proper. In the other application I exhibit the switching and reversing mechanism.

I claim—

In a perambulator, the combination of a frame and wheels, with an axle, a worm wheel on such axle, a case for such worm wheel, and a support for such case, consisting of two parts on the axle, a large aperture collar about the same, two disk shaped plates at the ends thereof, and anti-friction rollers between the disk shaped plates and the parts on the axle.

EMIL E. KELLER.

Witnesses:
FRANCIS W. PARKER,
WALTER J. GUNTHORP.